US012734936B2

(12) United States Patent
Wilkinson et al.

(10) Patent No.: US 12,734,936 B2
(45) Date of Patent: Sep. 15, 2026

(54) SIMPLIFIED MANUFACTURING SENSOR IMPLEMENTATION

(71) Applicant: Tactual Labs Co., New York, NY (US)

(72) Inventors: David Clark Wilkinson, Austin, TX (US); Matthew James Connolly, Nevada City, CA (US); Michael Smith, Austin, TX (US)

(73) Assignee: Tactual Labs Co., New York, NY (US)

( * ) Notice: Subject to any disclaimer, the term of this patent is extended or adjusted under 35 U.S.C. 154(b) by 0 days.

(21) Appl. No.: 18/864,721

(22) PCT Filed: May 11, 2023

(86) PCT No.: PCT/US2023/021838
§ 371 (c)(1),
(2) Date: Nov. 11, 2024

(87) PCT Pub. No.: WO2023/220240
PCT Pub. Date: Nov. 16, 2023

(65) Prior Publication Data
US 2025/0313130 A1 Oct. 9, 2025

Related U.S. Application Data

(60) Provisional application No. 63/341,047, filed on May 12, 2022.

(51) Int. Cl.
*B60N 2/00* (2006.01)
*H01Q 1/32* (2006.01)

(52) U.S. Cl.
CPC ......... *B60N 2/0027* (2023.08); *B60N 2/0022* (2023.08); *B60N 2/0029* (2023.08); *H01Q 1/3208* (2013.01)

(58) Field of Classification Search
CPC .. B60N 2/0027; B60N 2/0022; B60N 2/0029; H01Q 1/3208
See application file for complete search history.

(56) References Cited

U.S. PATENT DOCUMENTS

2005/0072250 A1* 4/2005 Brown ................ B60N 2/0026 73/862.581
2007/0132559 A1* 6/2007 Schleeh ............ B60R 21/01532 340/425.5

(Continued)

FOREIGN PATENT DOCUMENTS

JP 2000211418 A 8/2000
JP 2012510407 A 5/2012

(Continued)

OTHER PUBLICATIONS

Machine Translation of the Japanese Search report explaining the relevance of the documents cited in this IDS.

*Primary Examiner* — Jason D Shanske
*Assistant Examiner* — Shams Dhanani
(74) *Attorney, Agent, or Firm* — Tactual Labs Co.; Tod A. Kupstas

(57) ABSTRACT

A sensing system determines movement and position of passengers and objects within a vehicle or in another location. The sensing system is able to transmit a plurality of signals during a transmission period and use the sensed signals during a frame in order to create different heat maps that represent movement and position of person or an object during an integration period. The flexibility and capability of the sensing system and its antennas enable the sensing systems to be placed within or adjacent to components in such a manner as to reduce construction costs.

20 Claims, 8 Drawing Sheets

(56) References Cited

U.S. PATENT DOCUMENTS

| | | | | |
|---|---|---|---|---|
| 2009/0243350 | A1* | 10/2009 | Nishide | B60N 2/5635 297/180.1 |
| 2011/0290775 | A1* | 12/2011 | Cubon | G01G 19/4142 29/601 |
| 2013/0207676 | A1 | 8/2013 | Virnich et al. | |
| 2014/0252813 | A1* | 9/2014 | Lee | H02J 50/12 297/180.12 |
| 2015/0008710 | A1* | 1/2015 | Young | B60N 2/0276 297/217.3 |
| 2017/0150929 | A1* | 6/2017 | Sankai | A61B 5/026 |
| 2018/0364840 | A1* | 12/2018 | Alack, Jr. | G06F 1/163 |
| 2019/0031061 | A1* | 1/2019 | Reith | B60N 2/0022 |

FOREIGN PATENT DOCUMENTS

| | | | |
|---|---|---|---|
| JP | 2015168401 | A | 9/2015 |
| JP | 2020532455 | A | 11/2020 |

* cited by examiner

SIMPLIFIED MANUFACTURING SENSOR IMPLEMENTATION

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The disclosed systems and methods relate in general to the field of sensing, and in particular to implementation and integration of sensors in complex environments.

BRIEF DESCRIPTION OF THE DRAWINGS

Objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention. Although example embodiments and associated data are disclosed for the purpose of illustrating the invention, other embodiments and associated data will be apparent to a person of skill in the art, in view of this disclosure, without departing from the scope and spirit of the disclosure herein.

DETAILED DESCRIPTION

Figure 1:
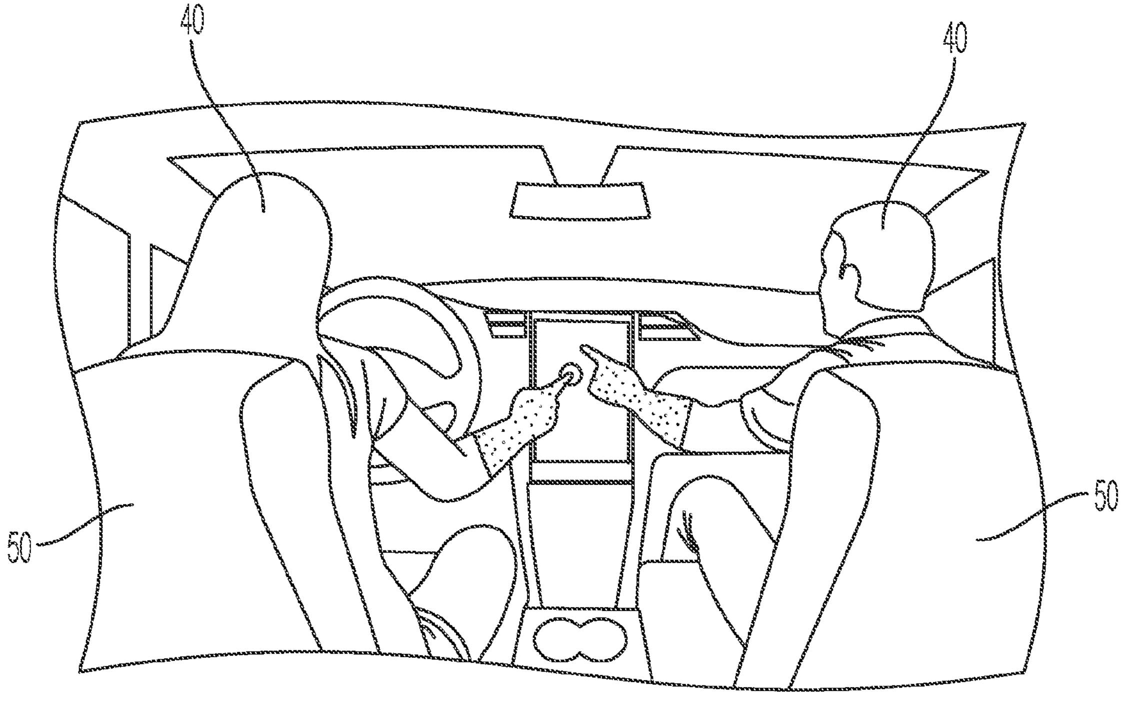
FIG. 1 is an illustration of occupants within a vehicle.

In various embodiments, the present disclosure is directed to sensing systems that are able to be manufactured and assembled in order to take advantage of complex environments and components within those environments. In general, the sensing systems described herein are able to sense both objects and people within certain environments. For example, in an embodiment, the sensing system is sensitive to the determination of movement and position of passengers and objects within a vehicle. The sensing system is able to transmit at least one signal and/or a plurality of signals during a measuring period and use received signals in order to represent movement and/or position of a person; in an embodiment the received signals are used to form heat maps that are reflective of movement and/or position of an object or person. By taking advantage of the flexibility of the components of the sensing system, the sensing system is able to be manufactured and installed in a complex environment, such as a vehicle seat, in order to reduce costs and avoid interference with other components that can occur in traditional sensing systems.

Throughout this disclosure, the term "event" may be used to describe periods of time in which movement and/or position of a body or object is determined. In accordance with an embodiment, events may be detected, processed, and/or supplied to downstream computational processes with very low latency, e.g., on the order of ten milliseconds or less, or on the order of less than one millisecond.

As used herein, and especially within the claims, ordinal terms such as first and second are not intended, in and of themselves, to imply sequence, time or uniqueness, but rather, are used to distinguish one claimed construct from another. In some uses where the context dictates, these terms may imply that the first and second are unique. For example, where an event occurs at a first time, and another event occurs at a second time, there is no intended implication that the first time occurs before the second time, after the second time or simultaneously with the second time. However, where the further limitation that the second time is after the first time is presented in the claim, the context would require reading the first time and the second time to be unique times. Similarly, where the context so dictates or permits, ordinal terms are intended to be broadly construed so that the two identified claim constructs can be of the same characteristic or of different characteristics. Thus, for example, a first and a second frequency, absent further limitation, could be the same frequency, e.g., the first frequency being 10 Mhz and the second frequency being 10 Mhz; or could be different frequencies, e.g., the first frequency being 10 Mhz and the second frequency being 11 Mhz. Context may dictate otherwise, for example, where a first and a second frequency are further limited to being frequency-orthogonal to each other, in which case, they could not be the same frequency.

The present application contemplates various embodiments of sensing systems. The sensing systems described herein are suited for use with frequency-orthogonal signaling techniques (see, e.g., U.S. Pat. Nos. 9,019,224 and 9,529,476, and 9,811,214, all of which are hereby incorporated herein by reference). The sensing systems discussed herein may be used with other signal techniques, including scanning or time division techniques, and/or code division techniques. The sensing systems described and illustrated herein are suitable for use in connection with signal infusion (also referred to as signal injection) techniques and apparatuses. Signal infusion is a technique in which a signal is transmitted to a person, that signal being capable of traveling on, within and through the person. In an embodiment, an infused signal causes the object of infusion (e.g., a hand, finger, arm or entire person) to become a transmitter of the signal.

This application also employs principles used in fast multi-touch sensors and other interfaces disclosed in the following: U.S. Pat. Nos. 9,933,880; 9,019,224; 9,811,214; 9,804,721; 9,710,113; 9,158,411; 10,191,579; 10,386,975; 10,175,772; 10,528,201; 10,528,182; 10,620,696; 10,705,667; 10,732,778; 10,795,437; 10,928,180; 11,099,680, and 11,209,936. Familiarity with the disclosure, concepts and nomenclature within these patents is presumed. The entire disclosure of these patents and applications incorporated therein by reference are incorporated herein by reference. This application also employs principles used in fast multi-touch sensors and other interfaces disclosed in the following: U.S. Patent Publication Application No. 2017/0371487A1; U.S. Provisional Patent Application Nos.; 62/575,005; 62/621,117; 62/619,656 and PCT Publication No. PCT/US2017/050547, familiarity with the disclosures, concepts and nomenclature therein is presumed. The entire disclosure of those applications and the applications incorporated therein by reference are incorporated herein by reference.

Certain principles of a fast multi-touch (FMT) sensor have been disclosed in the patents and patent applications mentioned above. Orthogonal signals may be transmitted into a plurality of transmitting antennas (or conductors) and information may be received by receivers attached to a plurality of receiving antennas (or conductors). In an embodiment, receivers "sample" the signal present on the receiving antennas (or conductors) during a sampling period (t). In an embodiment, signal (e.g. the sampled signal) is then analyzed by a signal processor to identify events (including, e.g., actual touch, near touch, hover and farther away events that cause a change in coupling between a transmitting antenna (or conductor) and receiving antennas (or conductor)). In an embodiment, one or more transmitting antennas (or conductors) can move with respect to one or more receiving antennas (or conductors), and such movement causes a change of coupling between at least one of the transmitting antennas (or conductors) and at least one of the receiving antennas (or conductors). In an embodiment, one or more transmitting antennas (or conductors) are relatively fixed with respect to one or more receiving antennas (or conductors), and the interaction of the signal and/or signals transmitted with environmental factors causes a change of coupling between at least one of the transmitting antennas (or conductors) and at least one of the receiving antennas (or conductors). The transmitting antennas (or conductors) and receiving antennas (or conductors) may be organized in a variety of configurations, including, e.g., a matrix, pattern conforming to the shape of an object, pattern conforming to convenient spacing within or on an object, pattern efficiently located within or on an object. In these arrangements, transmitting antennas and receiving antennas are able to be placed in locations where coupling of the signal between the transmitting antennas and receiving antennas results in information being provided regarding the object or person located proximate to the antennas of the sensing system. In an embodiment where the orthogonal signals are frequency orthogonal, spacing between the orthogonal frequencies, Δf, is at least the reciprocal of the integration period t, the integration period t being equal to the period during which the column conductors are sampled. Thus, in an embodiment, the signals received may be measured for one millisecond (t) using frequency spacing (Δf) of one kilohertz (i.e., Δf=1/t).

Generally, in embodiments, a signal processor of a mixed signal integrated circuit (or a downstream component or software) is adapted to determine at least one value representing each frequency orthogonal signal transmitted to (or present on) a row conductor (or antenna). In an embodiment, the signal processor of the mixed signal integrated circuit (or a downstream component or software) performs a Fourier transform on the signals present on a receive antenna (or conductor). In an embodiment, the mixed signal integrated circuit is adapted to digitize received signals. In an embodiment, the mixed signal integrated circuit (or a downstream component or software) is adapted to digitize the signals present on the receive conductor or antenna and perform a discrete Fourier transform (DFT) on the digitized information. In an embodiment, the mixed signal integrated circuit (or a downstream component or software) is adapted to digitize the signals present on the received conductor or antenna and perform a Fast Fourier transform (FFT) on the digitized information—an FFT being one type of discrete Fourier transform.

It will be apparent to a person of skill in the art in view of this disclosure that a DFT, in essence, treats the sequence of digital samples (e.g., window) taken during a sampling period (e.g., measuring period, integration period) as though it repeats. As a consequence, signals that are not center frequencies (i.e., not integer multiples of the reciprocal of the integration period (which reciprocal defines the minimum frequency spacing)), may have relatively nominal, but unintended consequence of contributing small values into other DFT bins. Thus, it will also be apparent to a person of skill in the art in view of this disclosure that the term orthogonal as used herein is not "violated" by such small contributions. In other words, as the term frequency orthogonal is used herein, two signals are considered frequency orthogonal if substantially all of the contribution of one signal to the DFT bins is made to different DFT bins than substantially all of the contribution of the other signal.

When sampling, in an embodiment, received signals are sampled at at least 1 MHz. In an embodiment, received signals are sampled at at least 2 MHz. In an embodiment, received signals are sampled at at least 4 Mhz. In an embodiment, received signals are sampled at 4.096 Mhz. In an embodiment, received signals are sampled at more than 4 MHz. To achieve kHz sampling, for example, 4096 samples may be taken at 4.096 MHz. In such an embodiment, the integration period is 1 millisecond, which per the constraint that the frequency spacing should be greater than or equal to the reciprocal of the integration period provides a minimum frequency spacing of 1 KHz. (It will be apparent to one of skill in the art in view of this disclosure that taking 4096 samples at e.g., 4 MHz would yield an integration period slightly longer than a millisecond, and not achieving kHz sampling, and a minimum frequency spacing of 976.5625 Hz.) In an embodiment, the frequency spacing is equal to the reciprocal of the integration period. In such an embodiment, the maximum frequency of a frequency-orthogonal signal range should be less than 2 MHz. In such an embodiment, the practical maximum frequency of a frequency-orthogonal signal range should be less than about 40% of the sampling rate, or about 1.6 MHz. In an embodiment, a DFT (which could be an FFT) is used to transform the digitized received signals into bins of information, each reflecting the frequency of a frequency-orthogonal signal transmitted which may have been transmitted by the transmitting antenna. In an embodiment 2048 bins correspond to frequencies from 1 KHz to about 2 MHz. It will be apparent to a person of skill in the art in view of this disclosure that these examples are simply that, exemplary. Depending on the needs of a system, and subject to the constraints described above, the sample rate may be increased or decreased, the integration period may be adjusted, the frequency range may be adjusted, etc.

In an embodiment, a DFT (which can be an FFT) output comprises a bin for each frequency-orthogonal signal that is transmitted. In an embodiment, each DFT (which can be an FFT) bin comprises an in-phase (I) and quadrature (Q) component. In an embodiment, the sum of the squares of the I and Q components is used as a measure corresponding to signal strength for that bin. In an embodiment, the square root of the sum of the squares of the I and Q components is used as measure corresponding to signal strength for that bin.

In an embodiment, a DFT (which can be an FFT) output comprises a bin for each frequency-orthogonal signal that is transmitted. In an embodiment, each DFT (which can be an FFT) bin comprises an in-phase (I) and quadrature (Q) component. In an embodiment, the sum of the squares of the I and Q components is used as a measure corresponding to magnitude, phase, and impedance for that bin. In an embodiment, the square root of the sum of the squares of the I and Q components is used as measure corresponding to magnitude for that bin. In an embodiment, the arctan of the I and Q components is used as a measure corresponding to phase for that bin. In an embodiment the magnitude and phase utilize Z=magnitude*(sin (wt)/sin (wt+phase)) as a measure corresponding to the impedance for that bin. for clarity w=2*pi*F, where pi=3.14 and F=Frequency.

In this application, the sensing systems that are manufactured and assembled in order to take advantage of complex environments and components within those environments are described with respect to a vehicle seat environment. However, it should be understood that the vehicle seat environment is by way of example and that other environments and settings that are able to implement sensing systems can take advantage of the versatility of the sensing systems and their respective components discussed herein. Further discussion regarding the implementation of the transmitting antennas (or conductors) and receiving antennas (or conductors) in association with vehicles can be found in U.S. Pat. No. 10,572,088 and U.S. Patent Application No. 11,112,905, the contents of all of the aforementioned applications incorporated herein by this reference.

Referring to FIG. 1, shown are occupants 40 sitting on seats 50 located within a vehicle. While the seats 50 shown in FIG. 1 are the seats located in the front row of the vehicle, it should be understood that any of the seats located within the vehicle may have sensing systems implemented therein, on, or proximate to an occupant. Additionally, sensing systems may be located in a portion of a vehicle seat or in more than one portion of a vehicle seat or vehicle seats. In an embodiment, one or more sensing systems may be located throughout the vehicle. In an embodiment, one or more sensing systems may be located at a location other than or in addition to a vehicle seat that permits determination of the presence of a passenger and/or activity within the vehicle. In an embodiment, one or more sensing systems may be located at a location other than or in addition to a vehicle seat that permits determination of the presence of a passenger or object in and/or activity upon the vehicle seat.

Figure 2:
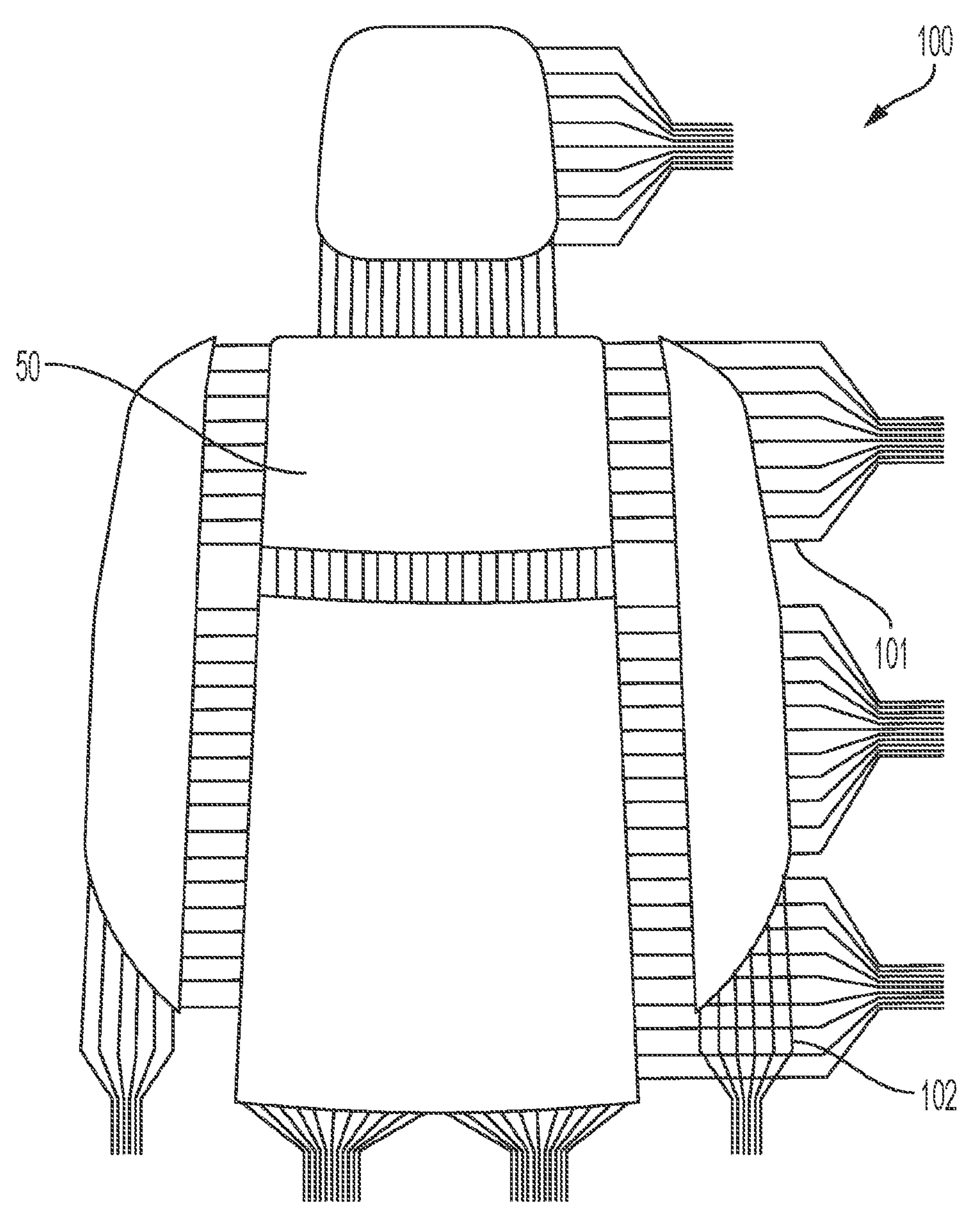
FIG. 2 shows a front view of an embodiment of a sensing system used with a vehicle seat.
Figure 3:
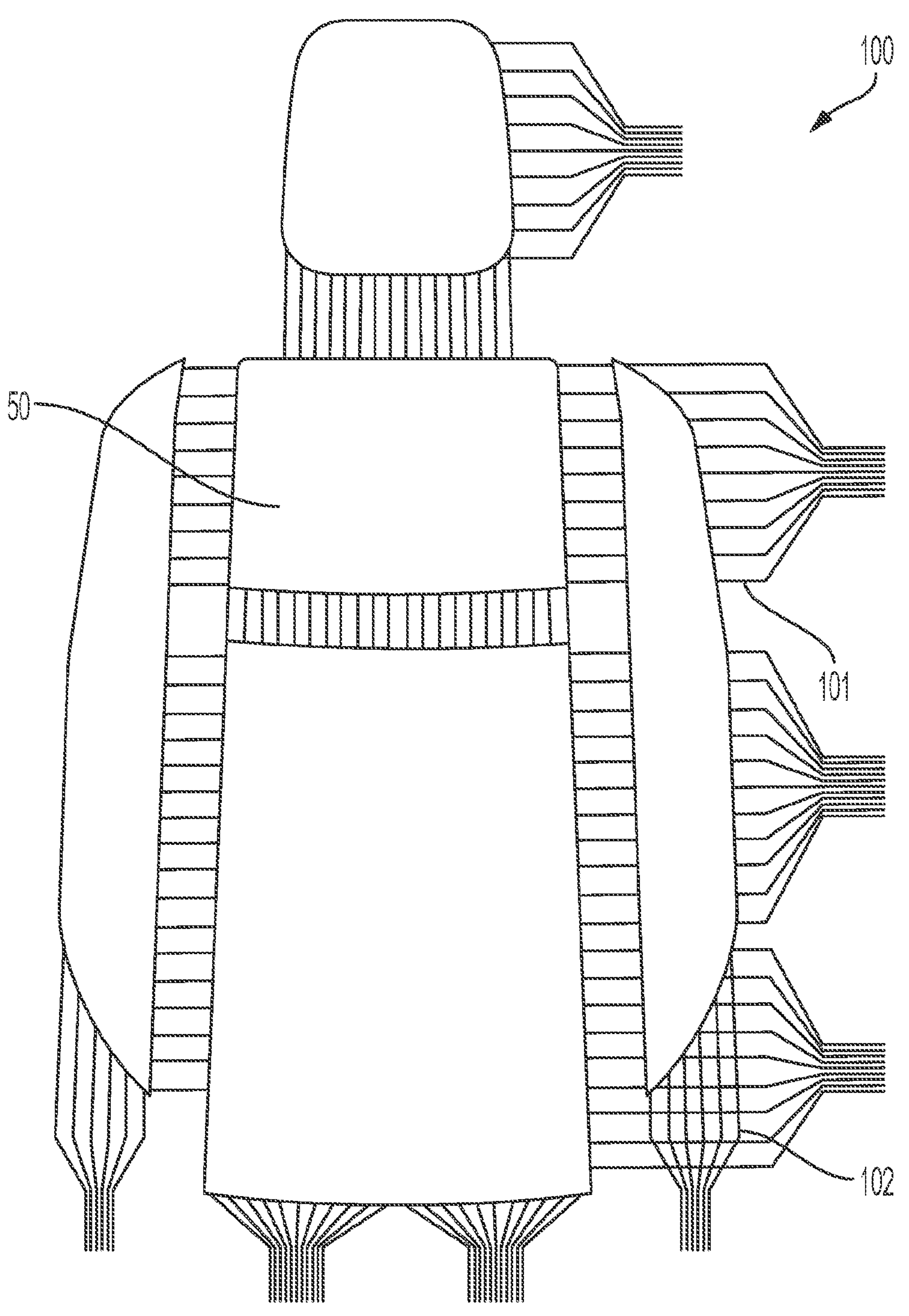
FIG. 3 shows a back view of an embodiment of a sensing system used with a vehicle seat.

FIGS. 2 and 3 show sensing system 100, which represents an example of a sensing system 100 placed in a seat. FIG. 2 shows a front view of a top layer of the seat 50. FIG. 3 shows a rear view of the top layer of the seat 50. The sensing system 100 is formed with transmitting antennas 101 and receiving antennas 102, which are operably connected to at least one transmitter (not shown), at least one receiver (not shown), and at least one signal processor (not shown). In an embodiment, there is only one transmitting antenna 101 and more than one receiving antenna 102. In an embodiment, there is more than one transmitting antenna 101 and only one receiving antenna 102. In an embodiment, the transmitting antenna 101 transmits more than one signal and there is only one receiving antenna 102 adapted to receive more than one of the transmitted signals. In an embodiment, transmitting antennas 101 can also function as receiving antennas and receiving antennas 102 can also function as transmitting antennas. In an embodiment, there is more than one layer of the sensing system 100 used in the seat 50. In an embodiment, each portion of the seat 50 has its own sensing system. In an embodiment, only some portions of the seat 50 have sensing systems. In an embodiment, the sensing systems are formed throughout an entirety of the seat 50. In FIGS. 2 and 3, the sensing system 100 is formed within a substantial portion of the seat 50.

In an embodiment, each transmitting antenna 101 transmits a unique orthogonal signal. In an embodiment, each transmitting antenna 101 transmits a unique frequency orthogonal signal. Receiving antennas 102 are adapted to receive signals transmitted by the transmitting antennas 101. Signals received by the receiving antennas 102 during a period of time (aka as integration period of time) are used to determine information regarding the item or person located on or proximate to the seat 50. In an embodiment, the information regarding the item or person located on or proximate to the seat is determined via the formation of heat maps based on the signals received by the receiving antennas 102 and that are subsequently processed.

Figure 4:
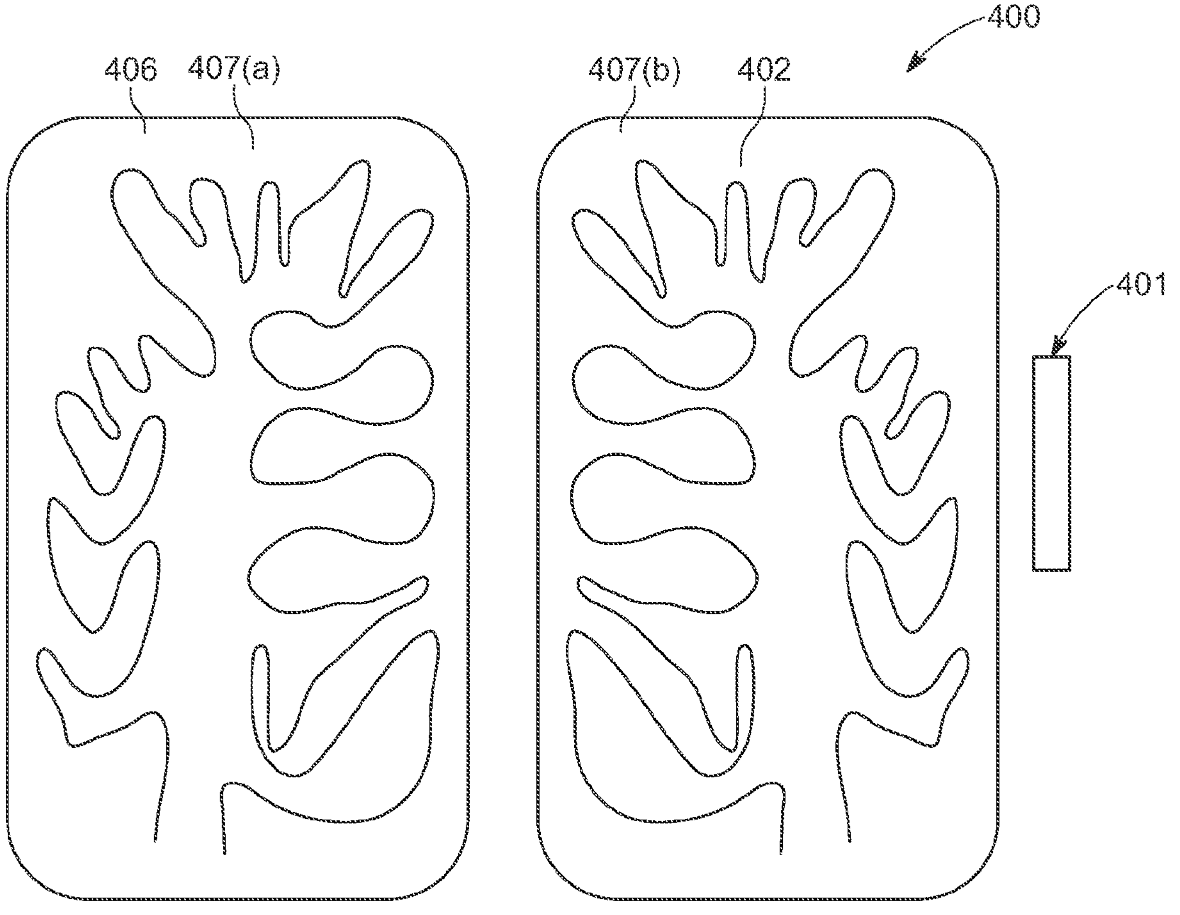
FIG. 4 shows a view of a portion of a sensing system conforming to an existing component structure.

FIG. 4 shows a partial view of sensing system 400 that is adapted to be placed within a complex environment in a manner that can reduce manufacturing costs and potentially avoid components interfering with or damaging each other. In an embodiment, the environment in which the sensing system 400 is implemented is that of a vehicle seat. In an embodiment, sensing system 400 comprises at least one receiving antenna 402 and at least one transmitting antenna 401 in which a field may be formed for sensing objects and people within an area.

In an embodiment, sensing system 400 comprises at least one receiving antenna 402 with multiple signal receivers, such as ADCs, attached to various points thereto. In an embodiment, sensing system 400 comprises at least one receiving antenna 402 formed from an elongated conductive material. In an embodiment, sensing system 400 comprises at least one receiving antenna 402 formed from an elongated conductive material and includes two or more receivers operatively attached to the receiving antenna 402, each receiver being operatively attached at a different location on the receiving antenna 402. In an embodiment, sensing system 400 comprises at least one receiving antenna 402 formed from an elongated conductive material and includes a receiver operatively attached at or near opposing ends thereof.

In an embodiment, the phase and/or frequency of the received signal at different locations on the receiving antenna 402 is used in establishing where an object or person is located with respect to the sensing system. In an embodiment, a receiving antenna 402 with more than one operably connected receivers is able to determine a location of an object or person by using the physical characteristics of the signals received. In an embodiment, there is a plurality of receiving antennas 402 and at least one transmitting antenna 401. In an embodiment, there is a plurality of transmitting antennas 401 and at least one receiving antenna 402. In an embodiment, there is a plurality of transmitting antennas 401 and a plurality of receiving antennas 402.

In FIG. 4, there is one receiving antenna 402 shown, the receiving antenna 402 being arranged in a specific pattern that is adapted to correspond to the pattern that component 406 will take in the same environmental space. In an embodiment, component 406 is an electrical component adapted to transmit electricity. In an embodiment, component 406 is a mechanical component such as a spring adapted to provide elasticity.

In an embodiment, the transmitting antennas shown in FIG. 4 are located within a different portion of a vehicle seat than that portion that is shown. In FIG. 4, the receiving antennas 402 shown in FIG. 4 form a pattern, in an embodiment, the pattern will be located within the vehicle seat. In an embodiment, one or more receiving antennas 402 are located in the vehicle seat and one or more transmitting antennas 401 are located in the vehicle seat back. In an embodiment, one or more receiving antennas 402 are located in the vehicle seat back and one or more transmitting antennas 401 are located in the vehicle seat. In an embodiment, both the vehicle seat and vehicle seat back have one or more transmitting antennas 401 and one or more receiving antennas 402.

In an embodiment, the component 406 is a portion of a mechanical spring that will be placed within the vehicle seat. The component 406 may be made from any material that is adapted to provide the appropriate mechanical elasticity. Typically such components are metal or plastic and therefore can be shaped in various ways that may be nonlinear or otherwise complex in shape. Further, such components may be both linear in nature and form curves, circles, ellipses, or other patterns that may be more complicated than a straight line. In an embodiment, the components 406 are located within vehicle seats. In an embodiment, the components 406 are located within a dashboard. In an embodiment, the components 406 are located within a steering wheel. In an embodiment, the components 406 are located within vehicle tires. In an embodiment, the components are located within a vehicle chassis.

In an embodiment, the component 406 is a metal wire that will be located within a vehicle seat. In an embodiment the component 406 is a heating wire that will be located within a vehicle seat. The component 406 may be any component that is adapted to transmit electricity. Typically such components are wires and therefore can be shaped in various ways that may be nonlinear or otherwise complex in shape. Further, such components may be both linear in nature and form curves, circles, ellipses, or other patterns that may be more complicated than a straight line. In an embodiment, components 406 are wires located within vehicle seats. In an embodiment, components 406 are wires located within a dashboard. In an embodiment, components 406 are wires located within a steering wheel. In an embodiment, components 406 are wires located within vehicle tires. In an embodiment, components 406 are wires located within a vehicle chassis.

In an embodiment, the component 406 is laid out in a complex pattern. In an embodiment, the component 406 is supported on a dielectric material 407(*a*). In an embodiment, the dielectric material 407(*a*) is felt. In an embodiment, other material or materials may be used in place of felt that have the same or similar physical properties. In an embodiment, the component 406 is stitched to the dielectric material 407(*a*).

Figure 5:
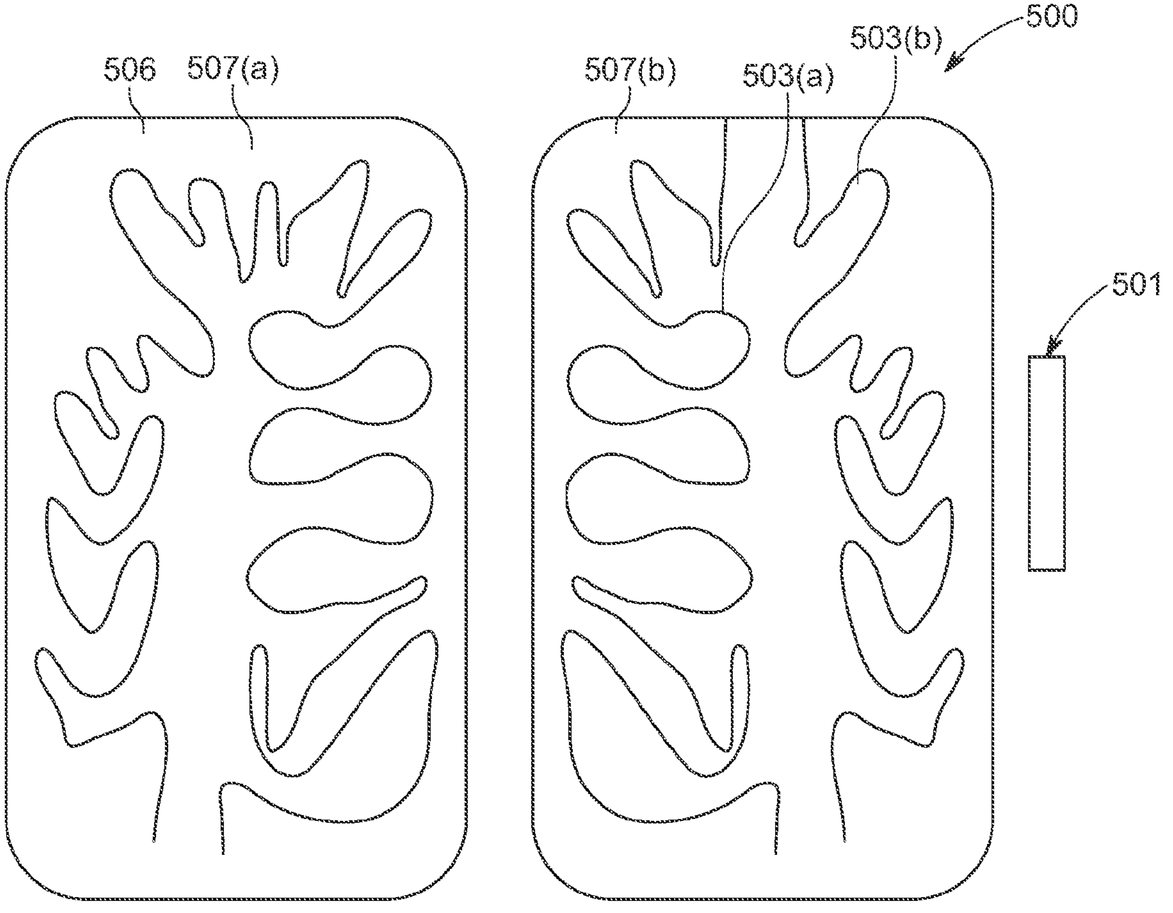
FIG. 5 shows another view of a portion of a sensing system conforming to an existing component structure.

FIG. 5 shows a partial view of sensing system 500 that is adapted to be placed within a complex environment in a manner that can reduce manufacturing costs and potentially avoid components interfering with or damaging each other. In an embodiment, the environment in which the sensing system 500 is implemented is that of a vehicle seat. In an embodiment, sensing system 500 comprises at least one receiving antenna 502 and at least one transmitting antenna 501 in which a field may be formed for sensing objects and people within an area.

In FIG. 5, there are two receiving antennas 503(*a*) and 503(*b*) shown, with each of the receiving antennas 503(*a*), 503(*b*) being arranged in a specific pattern that is adapted to correspond to the pattern that a component 506 will take in the same in environmental space. In an embodiment, component 506 is an electrical component adapted to transmit electricity. In an embodiment, component 506 is a mechanical component such as a spring adapted to provide elasticity.

In an embodiment, sensing system 500 comprises receiving antennas 503(*a*), 503(*b*) with multiple signal receivers, such as ADCs, attached to various points thereto. In an embodiment, sensing system 500 comprises receiving antennas 503(*a*), 503(*b*) formed from an elongated conductive material. In an embodiment, sensing system 500 comprises at least receiving antennas 503(*a*), 503(*b*) formed from an elongated conductive material and includes two or more receivers operatively attached to the receiving antennas 503(*a*), 503(*b*), each receiver being operatively attached at a different location on the at least receiving antennas 503(*a*), 503(*b*). In an embodiment, sensing system 500 comprises receiving antennas 503(*a*), 503(*b*) formed from an elongated conductive material and includes a receiver operatively attached at or near opposing ends thereof.

In an embodiment, the phase and/or frequency of the received signal at different locations on the receiving antennas 503(*a*), 503(*b*) is used in establishing where an object or person is located with respect to the sensing system. In an embodiment, receiving antennas 503(*a*), 503(*b*) with more than one operably connected receivers is able to determine a location of an object or person by using the physical characteristics of the signals received. In an embodiment, there is a plurality of receiving antennas 503(*a*), 503(*b*) and at least one transmitting antenna. In an embodiment, there is a plurality of transmitting antennas 501 and receiving antennas 503(*a*), 503(*b*). In an embodiment, there is a plurality of transmitting antennas 501 and receiving antennas 503(*a*), 503(*b*).

In FIG. 5, there are receiving antennas 503(*a*), 503(*b*) shown, the receiving antennas 503(*a*), 503(*b*) being arranged in a specific pattern that is adapted to correspond to the pattern that component 506 will take in the same environmental space. In an embodiment, component 506 is an electrical component adapted to transmit electricity. In an embodiment, component 506 is a mechanical component such as a spring adapted to provide elasticity.

In an embodiment, the transmitting antennas shown in FIG. 5 are located within a different portion of a vehicle seat than that portion that is shown. In FIG. 5, the receiving antennas form a pattern. In an embodiment, the pattern will be located within the vehicle seat. In an embodiment, one or more receiving antennas are located in the vehicle seat and one or more transmitting antennas are located in the vehicle seat back. In an embodiment, one or more receiving antennas are located in the vehicle seat back and one or more transmitting antennas are located in the vehicle seat. In an embodiment, both the vehicle seat and vehicle seat back have one or more transmitting antennas and one or more receiving antennas.

In an embodiment, the component 506 is a portion of a mechanical spring that will be placed within the vehicle seat. The component 506 may be made from any material that is adapted to provide the appropriate mechanical elasticity. Typically such components are metal or plastic and therefore can be shaped in various ways that may be nonlinear or otherwise complex in shape. Further, such components may be both linear in nature and form curves, circles, ellipses, or other patterns that may be more complicated than a straight line. In an embodiment, the components are located within vehicle seats. In an embodiment, the components 506 are located within a dashboard. In an embodiment, the components 506 are located within a steering wheel. In an embodiment, the components 506 are located within vehicle tires. In an embodiment, the components 506 are located within a vehicle chassis.

In an embodiment, the component 506 is a metal wire that will be located within a vehicle seat. In an embodiment the component 506 is a heating wire that will be located within a vehicle seat. The component 506 may be any component that is adapted to transmit electricity. Typically such components are wires and therefore can be shaped in various ways that may be nonlinear or otherwise complex in shape. Further, such components may be both linear in nature and form curves, circles, ellipses, or other patterns that may be more complicated than a straight line. In an embodiment, components 506 are wires located within vehicle seats. In an embodiment, components 506 are wires located within a dashboard. In an embodiment, components 506 are wires located within a steering wheel. In an embodiment, components 506 are wires located within vehicle tires. In an embodiment, components 506 are wires located within a vehicle chassis.

In an embodiment, the component 506 is laid out in a complex pattern. In an embodiment, the component 506 is supported on a dielectric material 507(*a*). In an embodiment, the dielectric material 507(*a*) is felt. In an embodiment, other material or materials may be used in place of felt that have the same or similar physical properties. In an embodiment, the electrical component 506 is stitched to the dielectric material 407(*a*).

In an embodiment, the receiving antennas 503(*a*), 503(*b*) are also supported by a material such as felt. In an embodiment, the material 507(*b*) is dielectric. In an embodiment, the material 507(*b*) is felt. In an embodiment, another material may be used in place of felt that has the same or similar physical properties. In an embodiment, the receiving antennas 503(*a*), 503(*b*) are also stitched to the material 507(*b*).

Because of the properties of the sensing system 500 and its respective components and operation, the receiving antennas 503(*a*), 503(*b*) are able to be stitched to the material 507(*b*) in a corresponding pattern that corresponds to the pattern that is formed by the arrangement of the component 506. When the material 507(*a*) with the component 506 is placed on top of the material 507(*b*) and the receiving antennas 503(*a*), 503(*b*), the respective patterns of the electrical component 506 and the receiving antennas 503(*a*), 503(*b*) are substantially the same and match each other.

In an embodiment, the receiving antennas 503(*a*), 503(*b*) are also supported by a material such as felt. In an embodiment, the material 507(*b*) is dielectric. In an embodiment, the material 507(*b*) is felt. In an embodiment, another material may be used in place of felt that has the same or similar physical properties. In an embodiment, the receiving antennas 503(*a*), 503(*b*) are also stitched to the material 507(*b*).

Because of the properties of the sensing system 500 and its respective components and operation, the receiving antenna receiving antennas 503(*a*), 503(*b*) are able to be stitched to the material 507(*b*) in a corresponding pattern that corresponds to the pattern that is formed by the arrangement of the component 506. When the material 507(*a*) with the component 506 is placed on top of the material 507(*b*) and the receiving antennas 503(*a*), 503(*b*), the respective patterns of the electrical component 506 and the receiving antennas 503(*a*), 503(*b*) are substantially the same and match each other.

Figure 6:
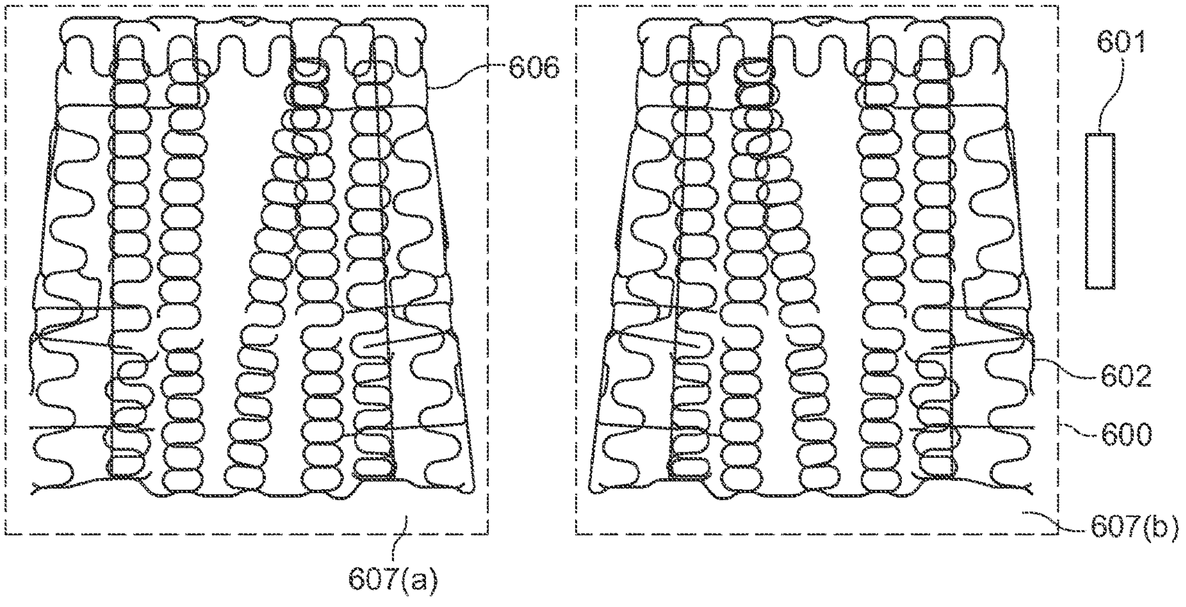
FIG. 6 shows another view of a portion of a sensing system conforming to an existing component structure.

In FIG. 6, there is one receiving antenna 602 shown, the receiving antenna 602 being arranged in a specific pattern that is adapted to correspond to the pattern in which a component 606 will take in the same in environmental space. In FIG. 6 component 606 is a mechanical component such as a spring adapted to provide elasticity. In an embodiment, component 606 has an electrical quality.

FIG. 6 shows a partial view of sensing system 600 that is adapted to be placed within a complex environment in a manner that can reduce manufacturing costs and potentially avoid components interfering with or damaging each other. In an embodiment, the environment in which the sensing system 600 is implemented is that of a vehicle seat. In an embodiment, sensing system 600 comprises at least one receiving antenna 602 and at least one transmitting antenna 601 in which a field may be formed for sensing objects and people within an area.

In an embodiment, sensing system 600 comprises at least one receiving antenna 602 with multiple signal receivers, such as ADCs, attached to various points thereto. In an embodiment, sensing system 600 comprises at least one receiving antenna 602 formed from an elongated conductive material. In an embodiment, sensing system 600 comprises at least one receiving antenna 602 formed from an elongated conductive material and includes two or more receivers operatively attached to the receiving antenna 602, each receiver being operatively attached at a different location on the receiving antenna 602. In an embodiment, sensing system 600 comprises at least one receiving antenna 602 formed from an elongated conductive material and includes a receiver operatively attached at or near opposing ends thereof.

In an embodiment, the phase and/or frequency of the received signal at different locations on the receiving antenna 602 is used in establishing where an object or person is located with respect to the sensing system. In an embodiment, a receiving antenna 602 with more than one operably connected receivers is able to determine a location of an object or person by using the physical characteristics of the signals received. In an embodiment, there is a plurality of receiving antennas and at least one transmitting antenna. In an embodiment, there is a plurality of transmitting antennas 601 and at least one receiving antenna 602. In an embodiment, there is a plurality of transmitting antennas 601 and a plurality of receiving antennas 602.

In FIG. 6, there is one receiving antenna 602 shown, the receiving antenna 602 being arranged in a specific pattern that is adapted to correspond to the pattern that component 606 will take in the same environmental space. In an embodiment, component 606 is an electrical component adapted to transmit electricity. In an embodiment, component 606 is a mechanical component such as a spring adapted to provide elasticity.

In an embodiment, the transmitting antenna 601 shown in FIG. 6 is located within a different portion of a vehicle seat than that portion that is shown. In FIG. 6, the receiving antennas 602 shown in FIG. 6 form a pattern, in an embodiment, the pattern will be located within the vehicle seat. In an embodiment, one or more receiving antennas 602 are located in the vehicle seat and one or more transmitting antennas 601 are located in the vehicle seat back. In an embodiment, one or more receiving antennas 602 are located in the vehicle seat back and one or more transmitting antennas 601 are located in the vehicle seat. In an embodiment, both the vehicle seat and vehicle seat back have one or more transmitting antennas 601 and one or more receiving antennas 602.

In an embodiment, the component 606 is a portion of a mechanical spring that will be placed within the vehicle seat. The component 606 may be made from any material that is adapted to provide the appropriate mechanical elasticity. Typically such components are metal or plastic and therefore can be shaped in various ways that may be nonlinear or otherwise complex in shape. Further, such components may be both linear in nature and form curves, circles, ellipses, or other patterns that may be more complicated than a straight line. In an embodiment, the components 606 are located within vehicle seats. In an embodiment, the components 606 are located within a dashboard. In an embodiment, the components 606 are located within a steering wheel. In an embodiment, the components 606 are located within vehicle tires. In an embodiment, the components 606 are located within a vehicle chassis.

In an embodiment, the component 606 is a metal wire that will be located within a vehicle seat. In an embodiment the component 606 is a heating wire that will be located within a vehicle seat. The component 606 may be any component that is adapted to transmit electricity. Typically such components are wires and therefore can be shaped in various ways that may be nonlinear or otherwise complex in shape. Further, such components may be both linear in nature and form curves, circles, ellipses, or other patterns that may be more complicated than a straight line. In an embodiment, components 606 are wires located within vehicle seats. In an embodiment, components 606 are wires located within a dashboard. In an embodiment, components 606 are wires located within a steering wheel. In an embodiment, components 606 are wires located within vehicle tires. In an embodiment, components 606 are wires located within a vehicle chassis.

In an embodiment, the component 606 is laid out in a complex pattern. In an embodiment, the component 606 is supported on a dielectric material 607(*a*). In an embodiment, the dielectric material 607(*a*) is felt. In an embodiment, other material or materials may be used in place of felt that have the same or similar physical properties. In an embodiment, the electrical component 606 is stitched to the dielectric material 607(*a*).

In an embodiment, the receiving antenna 602 is also supported by a material such as felt. In an embodiment, the material 607(*b*) is dielectric. In an embodiment, the material 607(*b*) is felt. In an embodiment, another material may be used in place of felt that has the same or similar physical properties. In an embodiment, the receiving antenna 602 is also stitched to the material 607(*b*).

Because of the properties of the sensing system 600 and its respective components and operation, the receiving antenna 602 is able to be stitched to the material 607(*b*) in a corresponding pattern that corresponds to the pattern that is formed by the arrangement of the component 606. When the material 607(*a*) with the component 606 is placed on top of the material 607(*b*) and the receiving antenna 602, the respective patterns of the electrical component 606 and the receiving antenna 602 or antennas are substantially the same and match each other.

Figure 7:
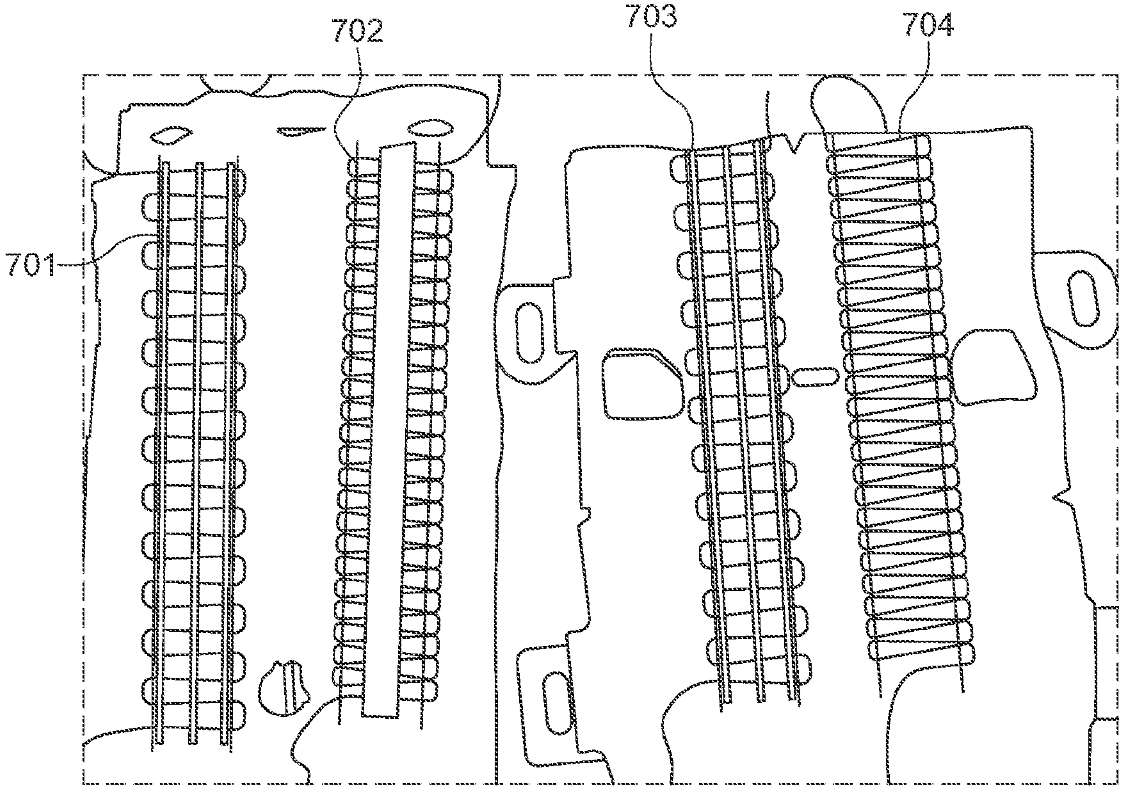
FIG. 7 shows a view of stitching used in securing portions of the sensing system together.

FIG. 7 shows different types of stitching that may be used with different types of antennas, depending on the ultimate pattern that is desired to be obtained. The stitching weave used may vary depending on proximity of the wire, the material used and the nature of the overall pattern. The sensing system and the antennas implemented in the sensing systems permit the system to be able to conform to complex patterns that may be formed by electrical components, mechanical components, and/or combinations thereof.

Stitching pattern 701 is formed from bends that are larger than the bends of stitching pattern 702. Stitching pattern 703 is formed from bends that are larger than the bends in stitching pattern 702. The stitching pattern 704 is formed from bends that are smaller than the bends in stitching pattern 701 and stitching pattern 703. The stitching patterns are formed in S-like patterns. The bend in each turn can be wide or small. The size of the bend is determined by the distance between the two legs of the bend. In an embodiment, a stitching pattern is formed from different sized bends.

Figure 8:
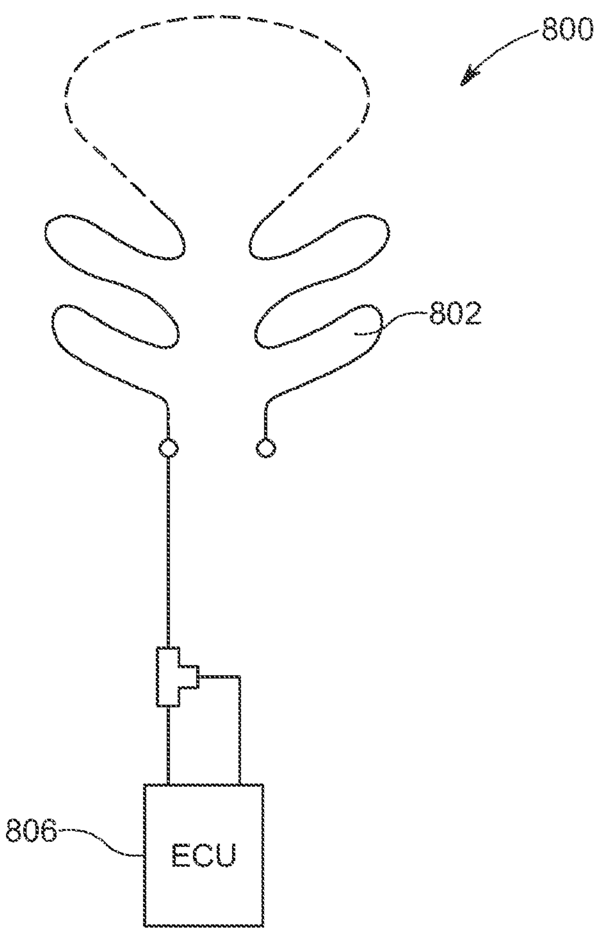
FIG. 8 shows another view of a portion of a sensing system conforming to an existing component structure.

FIG. 8 shows another view of a portion of a sensing system 800 conforming to an existing component structure. This is a seat wire having one side that is connected to double receivers at an enclosure 806. FIG. 8 shows a receiving antenna 802 that is shaped to conform to an electronic component or a mechanical component (not shown) in the environment of a vehicle. The receiving antenna 802 has one terminal of the receiving antenna 802 connected to an enclosure 806 having more than one receiver (not shown). In an embodiment, the signals received at the receivers are adapted to determine the position of an object, person, or creature with respect to the receiving antennas 802. In an embodiment, there are two receivers located in the enclosure 806. In an embodiment, there are three receivers located in the enclosure 806. In an embodiment, there are more than three receivers located in the enclosure 806.

In an embodiment, the receiving antennas and the electrical components are directly connected to each other without the presence of a dielectric material. In an embodiment, the receiving antennas and the electrical components are directly contacting each other without the presence of a dielectric material. In an embodiment, the receiving antennas and the electrical components are secured to each other without the presence of a dielectric material. In an embodiment, the transmitting antennas and the electrical components are directly connected to each other without the presence of a dielectric material. In an embodiment, the receiving antennas, the transmitting antennas, and the electrical components are directly connected to each other without the presence of a dielectric material.

In an embodiment, the receiving antenna(s) and the components are each affixed to the same or opposite sides of a material. In an embodiment, the transmitting antennas and the components are each operatively attached to the same or opposite sides of the material. In an embodiment, the receiving antennas, the transmitting antennas, and the electrical components are all operatively attached to one or the other sides of the material.

In an embodiment, the components are made of wire. In an embodiment, the receiving antenna(s) are made of copper wire, ITO, carbon fiber wire, or other material suitable for receiving signals. In an embodiment, the transmitting antenna(s) are made of copper wire, copper wire, ITO, carbon fiber wire, or other material suitable for receiving signals. In an embodiment, the receiving antenna(s) s and transmitting antenna(s) are made of the same material. In an embodiment, the receiving antenna(s) and transmitting antenna(s) are made of copper wire. In an embodiment, the receiving antenna(s) and transmitting antenna(s) are made of carbon fiber wire. In an embodiment, one or more of the receiving antennas are made of copper wire and one or more of the transmitting antennas are made of carbon fiber wire. In an embodiment, one or more of the receiving antennas are made of carbon fiber wire and one or more of the transmitting antennas are made of copper wire.

In an embodiment, the similarity of the patterns permits two sections of material to be effectively stitched together to form a unitary sheet having both the electrical components and the receiving antenna or antennas. This conserves space and prevents the physical features of an electrical or mechanical component and the receiving antenna(s) from inadvertently damaging each other when there is movement of a vehicle seat when installed. For example, if there is compression in one direction that may move the component in a direction it will also move the receiving antenna(s) in the same direction. If the patterns did not substantially or at least partially match, movement of the component may make it come into contact with the receiving antenna(s) in such a way that one of the two may be damaged.

In an embodiment, the similarity of the patterns permits the component and the receiving antenna or antennas to be effectively stitched together to the same or opposite sides of a material. This conserves space and prevents the physical features of the electrical components and the receiving antenna(s) from inadvertently damaging each other when there is movement of a vehicle seat when installed. For example, if there is compression in one direction that may move the component in a direction it will also move the receiving antenna(s) in the same direction. If the patterns did not substantially or at least partially match, movement of the electrical component may make it come into contact with the receiving antenna(s) in such a way that one of the two may be damaged.

Due to the nature of the sensing system, the proximity of the components to one or more of the receiving antennas and/or one or more of the transmitting antennas will not inhibit the ability of the sensing system to be able to determine the movement, presence, and activity of a person, creature, or object in an area, for example, in a vehicle seat.

In an embodiment, the transmitting antenna is adapted to transmit at least one signal. In an embodiment, a plurality of transmitting antennas are adapted to transmit at least one signal. In an embodiment, a transmitting antenna is adapted to transmit a plurality of frequency orthogonal signals. In an embodiment, a plurality of transmitting antennas are adapted to transmit a plurality of frequency orthogonal signals. In an embodiment, a plurality of transmitting antennas are adapted to respectively transmit each of a plurality of frequency orthogonal signals. In an embodiment, each signal transmitted is frequency orthogonal to each other signal transmitted during an integration period. In embodiment, there is one transmitting antenna adapted to transmit more than one signal during each measuring period. In an embodiment, one transmitting antenna transmits a plurality of signals.

The sensing system is able to transmit and receive signals with a rapidity that does not interfere with existing electrical components. Thus the wires that comprise the transmitting and receiving antennas are able to be run throughout, for example, a vehicle, without compromising the physical presence or electrical presence of other electrical components.

In an embodiment, the material of a seat has embedded within it a sensing system formed of transmitting and receiving antennas (also referred to herein as conductors). In an embodiment, the material of the seat has placed on it a sensing system formed of transmitting and receiving antennas. In an embodiment, the seat has embedded within it and placed upon it sensing systems formed of transmitting and receiving antennas. In an embodiment, antennas are placed upon a flexible substrate (which could be made from a non-conductive fabric, plastic or elastomeric material) and used to form the material of the seat. In an embodiment, antennas are embedded within a flexible substrate and used to form the material of the seat. In an embodiment, thread is placed on or stitched into a flexible material (e.g., fabric) in a manner that permits a desired expansion (e.g., zig-zag, waves, etc.) in one or more desired dimensions and used to form the seat. In an embodiment, a flexible substrate or fabric has crossing zig-zag patterns (or e.g., crossing sine wave patterns) used to form the seat. In an embodiment, the flexible substrate or the fabric has one of the patterns discussed above or another pattern adapted to withstand the flexible use by people.

A transmitter transmits a unique frequency orthogonal signal on each of the one or more transmitting antennas. These transmitted signals cause a field to be formed between the one or more transmitting antennas and the one or more receiving antennas. Interference with or changes in the field are measured by a signal processor from measurements made by one or more receivers operatively attached to the one or more receiving antennas. The interference with or changes in the field can be used to form a heat map, or other set of data, reflecting the interaction that is occurring with the vehicle seat.

In an embodiment, each of the antennas functions as either a transmitting antenna or receiving antenna. In an embodiment, there is one transmitting antenna and one receiving antenna. In an embodiment, there is at least one transmitting antenna and a plurality of receiving antennas. In an embodiment, there is a plurality of transmitting antennas and at least one receiving antenna. In an embodiment, there is one or more transmitting antennas and one receiving antenna employing a plurality of receivers operatively receiving signals at different locations on the receiving antenna.

When an occupant sits on the seat in the vehicle there is movement of and/or within the seat. The material from which the seat is formed moves and/or flexes. In an embodiment, this movement causes the transmitting antennas and receiving antennas to move. In an embodiment, the movement causes the transmitting antennas and receiving antennas to move with respect to each other. This movement impacts the measurement of signal that is received by the receiving antennas. This movement not only occurs when an occupant sits on the seat, but also during the movement of the vehicle and while the occupant is sitting on the seat when the car is at rest. Additionally, the occupant can interact with the field generated by the transmitting antenna or antennas and the receiving antenna or antennas. The interaction of the occupant with the field causes different measurements to be taken by the system.

Processed measurements taken from the receivers connected to the receiving antennas can be used in order to determine whether or not an occupant is seated on the seat. The measurements taken and processed by the signal processor are able to be used by the sensing system to be further processed in order to determine a use of the seat. In an embodiment, a determination of the use of the seat is run on the signal processor and is able to take the measurements and determine if there is a use of the seat. In an embodiment, the determination of the use of the seat is performed by software logic that processes the measurements processed by the signal processor. In an embodiment, the determination of the use of the seat is determined by a part of the sensing system located separately from the signal processor. In an embodiment, the determination of the use of the seat is performed by circuitry that processes the measurements processed by the signal processor. In an embodiment, the determination of the use of the seat is performed by part of the sensing system located in the vehicle at a location away from the seat. In an embodiment, the determination of the use of the seat is located in the vehicle at a location proximate to the seat.

In an embodiment, the sensing system detects a presence or absence of an occupant of the vehicle. In an embodiment, the sensing system detects a biometric of an occupant. In an embodiment, the sensing system determines the heart rate of an occupant. In an embodiment, the sensing system determines respiratory activity of an occupant. In an embodiment, the sensing system determines a weight estimate of an occupant. In an embodiment, the sensing system determines a height estimate of an occupant. In an embodiment, the sensing system detects the position of an occupant within the seat. In an embodiment, the sensing system detects a type of occupant within the seat. In an embodiment, the sensing system determines if a car is stolen or being properly utilized based on determined occupant ID. In an embodiment, the sensing system detects the presence of a child. In an embodiment, the sensing system detects the presence of a child seat. In an embodiment, the sensing system detects the presence of a child in the child seat. In an embodiment, the sensing system detects the position of the occupant within the vehicle. In an embodiment, the sensing system determines the position of a seat back. In an embodiment, the sensing system determines the comfort settings of a seat. In an embodiment, the sensing system detects the distance of a head from head rest. In an embodiment, the sensing system detects a type of % classification category of occupant vs. non-occupant detection (i.e. an object present but exclusively not a human occupant). In an embodiment, the sensing system determines if something is left behind in a vehicle or located within a vehicle. In an embodiment, the sensing system detects an object. In an embodiment, the sensing system detects an object via passive means. In an embodiment, the sensing system detects an object via active means. In an embodiment, the sensing system detects a type of occupant object by either active and/or passive means. In an embodiment, the sensing system detects at least one of a person, car seat, purse, laptop, phone, dog, cat, etc. In an embodiment, each logic category (i.e., presence or absence of human occupant), or measurement estimation (i.e. height weight) can each separately also include a calculated factor of confidence (i.e. confidence level) (e.g. 99.9999% empty, 80% confidence height 5' 6"). In an embodiment, the sensing system detects cushion and back pressure distribution. In an embodiment, the sensing system determines dynamic movement, such as how much and how often an occupant moves.

As noted above, information in addition to presence regarding the occupant can be ascertained due to the sensitivity of the sensors being implemented. In an embodiment, machine learning is applied to the data received from the measurements taken by the sensing system within or on a seat in order to accurately determine the weight of the individual sitting on a seat. By being able to accurately determine physical characteristics of the person sitting on the seat, the vehicle can further be programmed to respond accordingly by correlating the weight of the person with the likely identity of the driver.

For example, in an embodiment, the vehicle automatically adjusts its settings when the sensing system senses that a 185 pound man is sitting in the car. The settings of the car may be adjusted for the person most likely associated with the 185 pound weight reading. In an embodiment, the number of occupants in a vehicle is determined using the measurements from the sensing system. In an embodiment, the number of and weight of the occupants in a vehicle is determined using the sensors. In an embodiment, the vehicle is programmed in order to determine the identity of the occupants based upon where they are sitting, their weight and/or other physical characteristics ascertained via the sensing system. In an embodiment, the vehicle optimizes fuel usage based on the vehicle load determined by the sensing system. In an embodiment, sensing systems in the passenger area determine, based on the weight reading, if there remains an infant in a car seat. This reading is then used to trigger an alarm, or other warning indicator, if the infant is not removed when the vehicle is stopped for a period of time.

It should be understood that sensing systems may be located at other locations on and within the seat in addition to the sitting area of the seat. In an embodiment, sensing systems or components of the sensing system are located within the back area of the seat. Sensing systems located in the back area of the seat can be used in order to determine information regarding various movements of the occupant. For example, sudden movements can be used in order to determine additional information related to the speed of the vehicle or the terrain the vehicle may be moving over. In an embodiment, this type of information is used by the vehicle to adjust the controls of the vehicle or the movement of the vehicle. For example, in an embodiment, determination that there is sudden movement or jerking over a threshold deploys airbags or triggers brake activity. In an embodiment, sensing systems are located within the headrest of the vehicle. In an embodiment, biometric data is taken regarding the occupant based upon his or her interaction with the seat. In an embodiment, the position and movements of an occupant are used to determine if the occupant is falling asleep. An alarm can be triggered if the occupant is falling asleep. Other potentially dangerous situations can also be monitored and detected by the sensing systems based on positioning and movements of the occupant while on the seat, such as distracted driving and driving under the influence of a substance.

Furthermore, while car seats are shown, it should be understood that the sensing systems can be used with the seats of vehicles other than cars. In an embodiment, the sensing systems are used in truck seats. In an embodiment, the sensing systems are used in boat seats. In an embodiment, the sensing systems are embedded in waterproof material in the boat seats. In an embodiment, the sensing systems are used in plane seats. In an embodiment, the sensing systems are used in train seats.

Also, while the seats discussed herein are discussed within the context of vehicles, seats, chairs and the like, the sensing systems can be implemented within or on fabrics and materials within seats found elsewhere. In an embodiment, the sensing systems are used in stadium seats. In an embodiment, the sensing systems are used with chairs within homes. In an embodiment, the sensing systems are used with seating in waiting rooms. In an embodiment, the sensing systems are used with seating on rides in amusement parks.

An aspect of this disclosure is a sensing system operably connected to a vehicle seat. The sensing system comprising at least one transmitting antenna, wherein a plurality of signals are transmitted during each integration period, each of the plurality of signals transmitted during an integration period orthogonal to each other signal transmitted during the integration period; at least one receiving antenna adapted to receive transmitted signals, wherein at least one of the transmitting antenna and the receiving antenna conforms to at least one component adapted to transmit electricity within the vehicle; and a processor adapted to determine a measurement of transmitted signals received, wherein the processor is further adapted to process the measurements to determine position or movement of an occupant or object.

Another aspect of the disclosure is a sensing system placed within a vehicle. The sensing system comprising at least one transmitting antenna, adapted to transmit at least one signal during a measuring period; at least one receiving antenna adapted to receive transmitted signals, wherein the receiving antenna conforms to at least one component adapted to transmit electricity within the vehicle; and a processor adapted to determine a measurement of transmitted signals received during the measuring period, wherein the processor is further adapted to process the measurements to determine position or movement of an occupant or object.

Another aspect of the disclosure is a sensing system placed within a vehicle. The sensing system comprising: at least one transmitting antenna, adapted to transmit at least one signal during a measuring period; at least one receiving antenna adapted to receive transmitted signals, wherein the receiving antenna conforms to at least one component adapted to transmit electricity within the vehicle; and a processor adapted to determine a measurement of transmitted signals received during the measuring period, wherein the processor is further adapted to process the measurements to determine position or movement of an occupant or object.

Another aspect of the disclosure is a sensing system. The sensing system comprising a signal transmission source adapted to transmit at least one signal during a measuring period; a receiving conductor that substantially conforms to at least one component that is not part of the sensing system; a first and second receiver operatively connected to the receiving conductor at a first and second location, respectively, and a processor adapted to determine a measurement for the at least one signal transmitted during the measuring period as received by each of the first and second receivers, wherein the processor is further adapted to process the measurements to determine position or movement of an occupant or object.

Still another aspect of the disclosure is a sensing system placed within a vehicle. The sensing system comprising: at least two transmitting antennas, each transmitting antenna adapted to transmit a signal that is orthogonal to each other signal transmitted during a measuring period; a receiving antenna adapted to receive transmitted signals, wherein the receiving antenna conforms to at least one component adapted to transmit electricity within the vehicle; and a processor adapted to determine a measurement of transmitted signals received during the measuring period, wherein the processor is further adapted to process the measurements to determine position or movement of an occupant or object.

While the invention has been particularly shown and described with reference to a preferred embodiment thereof, it will be understood by those skilled in the art that various changes in form and details may be made therein without departing from the spirit and scope of the invention.

The invention claimed is:

1. A sensing system operably connected to a vehicle seat comprising:

at least one transmitting antenna, wherein a plurality of signals are transmitted during each integration period, each of the plurality of signals transmitted during an integration period orthogonal to each other signal transmitted during the integration period;

at least one receiving antenna adapted to receive transmitted signals, wherein at least one of the transmitting antenna and the receiving antenna conforms to at least one component adapted to transmit electricity within the vehicle by forming a corresponding pattern; and a processor adapted to determine a measurement of transmitted signals received, wherein the processor is further adapted to process the measurements to determine position or movement of an occupant or object.

2. The sensing system of claim 1, further comprising a dielectric portion located between the receiving antenna and the at least one component adapted to transmit electricity.

3. The sensing system of claim 1, wherein the dielectric portion is made of felt material.

4. The sensing system of claim 1, wherein the at least one receiving antenna comprises copper.

5. The sensing system of claim 1, wherein the at least one receiving antenna comprises carbon fiber.

6. The sensing system of claim 1, wherein the at least one component adapted to transmit electricity and the at least one receiving antenna contact each other.

7. The sensing system of claim 1, wherein the at least one component adapted to transmit electricity and the at least one receiving antenna conform in shape to each other.

8. The sensing system of claim 1, wherein the at least one component adapted to transmit electricity and the at least one receiving antenna are arranged in the same pattern.

9. The sensing system of claim 1, wherein compression of a vehicle seat is determined, in part, by measuring signals received by the at least one receiving antenna.

10. The sensing system of claim 1, wherein the component adapted to transmit electricity is operably connected to a system adapted to adjust a position of a vehicle seat.

11. The sensing system of claim 1, wherein the component adapted to transmit electricity is operably connected to a system adapted to heat a vehicle seat.

12. The sensing system of claim 1, wherein both the transmitting antenna and the at least one receiving antenna are adapted to conform to the at least one component adapted to transmit electricity.

13. The sensing system of claim 1, wherein the at least one transmitting antenna is located within the seat portion of the vehicle seat and the at least one receiving antenna is located within the back portion of the vehicle seat.

14. A sensing system placed within a vehicle comprising:

at least one transmitting antenna, adapted to transmit at least one signal during a measuring period;

at least one receiving antenna adapted to receive transmitted signals, wherein the receiving antenna conforms to at least one component adapted to transmit electricity within the vehicle by forming a corresponding pattern; and a processor adapted to determine a measurement of transmitted signals received during the measuring period, wherein the processor is further adapted to process the measurements to determine position or movement of an occupant or object.

15. The sensing system of claim 14, further comprising a dielectric portion located between the receiving antenna and the at least one component adapted to transmit electricity.

16. The sensing system of claim 14, wherein the dielectric portion is made of felt material.

17. The sensing system of claim 14, wherein the at least one receiving antenna comprises copper.

18. The sensing system of claim 14, wherein the at least one receiving antenna comprises carbon fiber.

19. The sensing system of claim 14, wherein the at least one component adapted to transmit electricity and the at least one receiving antenna contact each other.

20. The sensing system of claim 14, wherein the component adapted to transmit electricity is operably connected to a system adapted to heat a vehicle seat.

* * * * *